(12) United States Patent
Yang et al.

(10) Patent No.: US 11,641,042 B2
(45) Date of Patent: May 2, 2023

(54) BATTERY AND ELECTRONIC DEVICE COMPRISING SAME

(71) Applicant: Samsung Electronics Co., Ltd., Gyeonggi-do (KR)

(72) Inventors: Seunghoon Yang, Gyeonggi-do (KR); Dol Kim, Gyeonggi-do (KR); Youngju Kim, Gyeonggi-do (KR); Sihoon Youm, Gyeonggi-do (KR); Jongmoon Yoon, Gyeonggi-do (KR); Moosoon Lee, Gyeonggi-do (KR); Jaeyeon Lee, Gyeonggi-do (KR); Sinyoung Jung, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 17/266,656

(22) PCT Filed: Aug. 6, 2019

(86) PCT No.: PCT/KR2019/009799
§ 371 (c)(1),
(2) Date: Feb. 8, 2021

(87) PCT Pub. No.: WO2020/032538
PCT Pub. Date: Feb. 13, 2020

(65) Prior Publication Data
US 2021/0351461 A1    Nov. 11, 2021

(30) Foreign Application Priority Data

Aug. 8, 2018 (KR) ........................ 10-2018-0092697

(51) Int. Cl.
*H01M 50/105* (2021.01)
*H01M 50/14* (2021.01)
(Continued)

(52) U.S. Cl.
CPC ..... *H01M 50/105* (2021.01); *H01M 10/0431* (2013.01); *H01M 50/14* (2021.01); *H04M 1/0262* (2013.01); *H01M 2220/30* (2013.01)

(58) Field of Classification Search
CPC .... H01M 5/105; H01M 5/14; H01M 10/0431; H01M 2220/30; H04M 1/0262
See application file for complete search history.

(56) References Cited

U.S. PATENT DOCUMENTS

2006/0051662 A1    3/2006   Kwak et al.
2009/0297929 A1   12/2009   Uchida
(Continued)

FOREIGN PATENT DOCUMENTS

KR    10-2005-0123366 A    12/2005
KR    10-2013-0105549 A     9/2013
(Continued)

*Primary Examiner* — Jane J Rhee
(74) *Attorney, Agent, or Firm* — Cha & Reiter, LLC

(57) ABSTRACT

A battery, according to one embodiment of the present invention, may comprise: a pouch; an electrode assembly received in the pouch in a state in which a positive electrode substrate, a negative electrode substrate disposed below the positive electrode substrate, and a separator disposed between the positive electrode substrate and the negative electrode substrate are rolled up together; a first adhesive member for fixing at least one portion of one end of the electrode assembly to the rolled up outer surface of the electrode assembly; and a second adhesive member for providing fixing between the electrode assembly and the pouch at a region other than the region where the first adhesive member is disposed.

15 Claims, 9 Drawing Sheets

(51) Int. Cl.
*H01M 10/04* (2006.01)
*H04M 1/02* (2006.01)

(56) References Cited

U.S. PATENT DOCUMENTS

2010/0255357 A1   10/2010   Baek et al.
2015/0010797 A1   1/2015   Kim
2015/0013151 A1   1/2015   Kang et al.

FOREIGN PATENT DOCUMENTS

| KR | 10-2015-0004678 A | 1/2015 |
| KR | 10-2018-0037748 A | 4/2018 |
| KR | 10-2018-0041979 A | 4/2018 |

BATTERY AND ELECTRONIC DEVICE COMPRISING SAME

CROSS REFERENCE TO RELATED APPLICATIONS

This application is a National Phase Entry of PCT International Application No. PCT/KR2019/009799, which was filed on Aug. 6, 2019, and claims a priority to Korean Patent Application No. 10-2018-0092697, which was filed on Aug. 8, 2018, the contents of which are incorporated herein by reference.

TECHNICAL FIELD

An embodiment of the present disclosure relates to a battery and an electronic device including the same.

BACKGROUND ART

With the growth of digital technologies, an electronic device is being provided in various forms such as a smart phone, a tablet personal computer (tablet PC), a personal digital assistant (PDA), etc. The electronic device is being developed even in the form of being wearable on a user to improve portability and user accessibility. The electronic device can include a battery for supplying a power source.

DISCLOSURE OF INVENTION

Technical Problem

A battery can be coupled to an internal structure and be disposed inside an electronic device. A shock, or a load, generated by a fall, etc. of the electronic device can damage the battery.

An embodiment of the present disclosure can offer a battery and an electronic device including the same, capable of decreasing a damage to a battery by an external shock.

Solution to Problem

A battery of an embodiment of the present disclosure can include a pouch, and an electrode assembly received in the pouch in a state in which a positive electrode substrate, a negative electrode substrate disposed below the positive electrode substrate, and a separator disposed between the positive electrode substrate and the negative electrode substrate are rolled up together, and a first adhesive member for fixing at least one portion of one end of the electrode assembly to the rolled up outer surface of the electrode assembly, and a second adhesive member for offering fixing between the electrode assembly and the pouch at a region other than the region where the first adhesive member is disposed.

An electronic device of an embodiment of the present disclosure can include a bracket, and a battery. The battery can include a pouch, and an electrode assembly received in the pouch in a state in which a positive electrode substrate, a negative electrode substrate disposed below the positive electrode substrate, and a separator disposed between the positive electrode substrate and the negative electrode substrate are rolled up together, and a first adhesive member for fixing at least one portion of one end of the electrode assembly to the rolled up outer surface of the electrode assembly, and a second adhesive member for offering fixing between the electrode assembly and the pouch at a region other than the region where the first adhesive member is disposed, and can include a third adhesive member for offering fixing between the outer surface of the pouch facing the first adhesive member and the bracket.

Advantageous Effects of Invention

A battery of an embodiment of the present disclosure, and an electronic device comprising the same, can distribute an external shock, or a load, generated by a fall, etc. such that it is not focused too much on a junction portion between an electrode assembly of the battery and a pouch, and due to this, can decrease a damage to the battery.

BEST MODE FOR CARRYING OUT THE INVENTION

Embodiments of the present disclosure will be described below with reference to the accompanying drawings.

Figure 1:
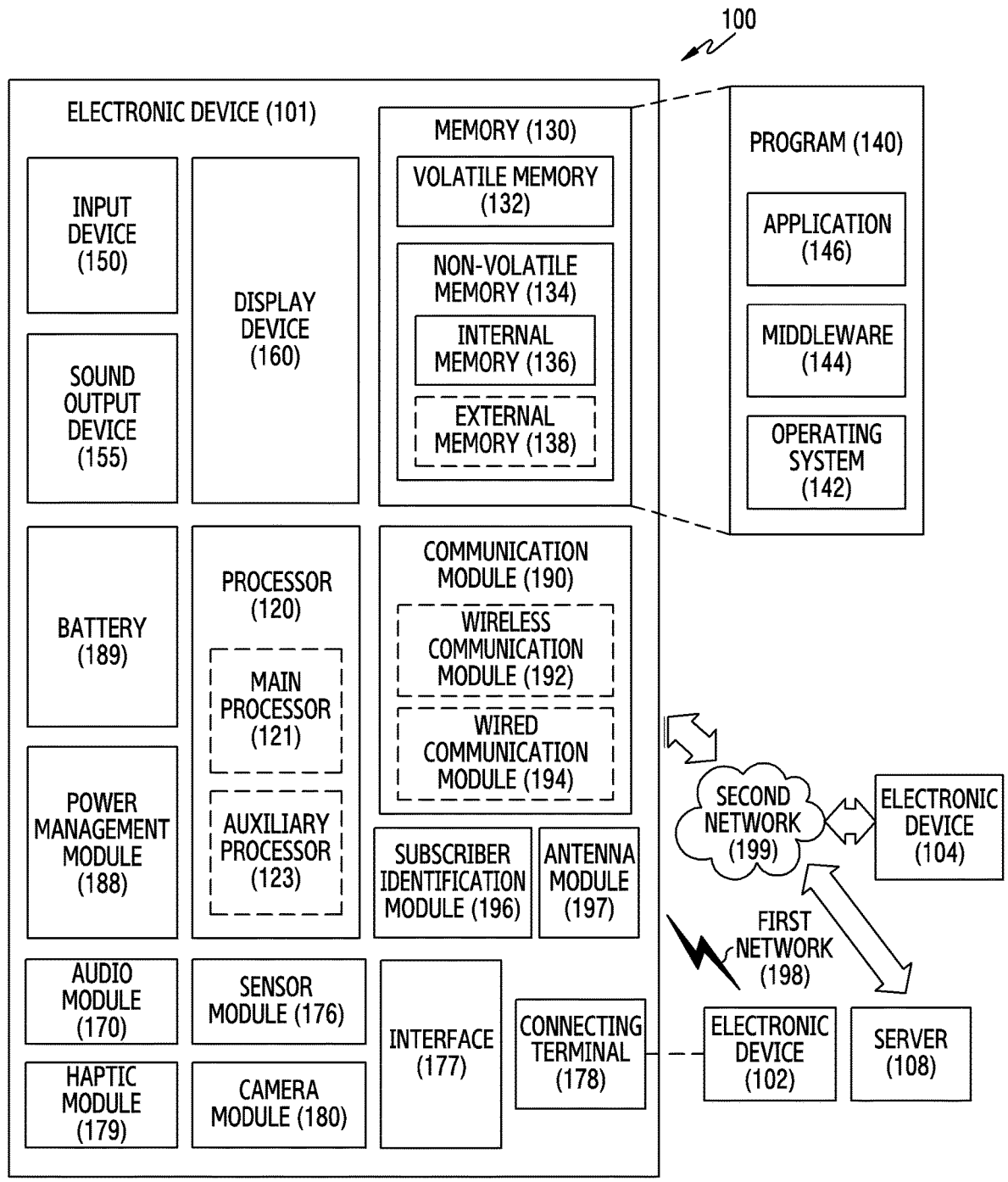
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
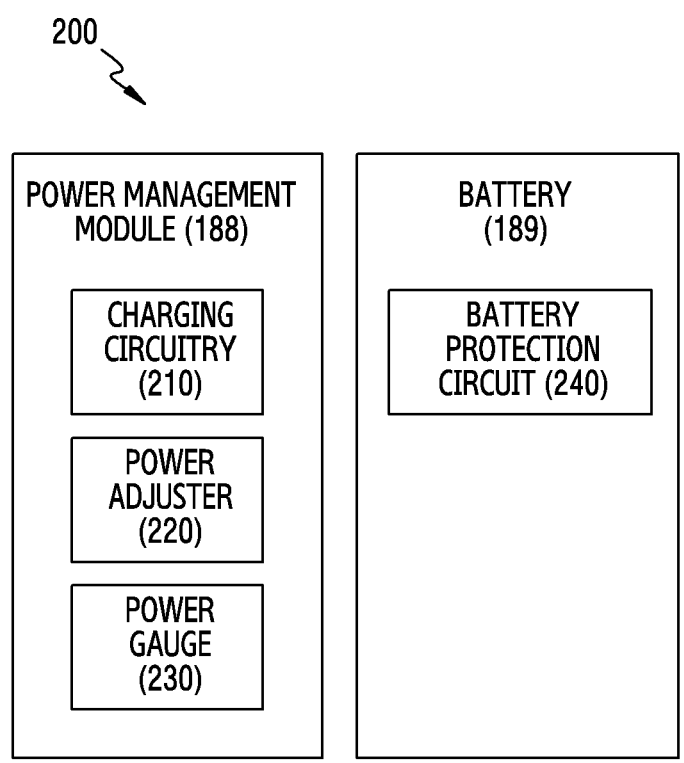
FIG. 2 is a block diagram of a power management module and a battery according to various embodiments.

FIG. 2 is a block diagram 200 of the power management module 188 and the battery 189 according to various embodiments. Referring to FIG. 2, the power management module 188 can include charging circuitry 210, a power adjuster 220, or a power gauge 230. The charging circuitry 210 can charge the battery 189 by using power supplied from an external power source outside the electronic device 101. According to an embodiment, the charging circuitry 210 can select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and can charge the battery 189 using the selected charging scheme. The external power source can be connected with the electronic device 101, for example, directly via the connecting terminal 178 or wirelessly via the antenna module 197.

The power adjuster 220, for example, can provide a plurality of powers having different voltage levels or different current levels by adjusting a voltage level or a current level of the power supplied from the external power source or the battery 189. The power adjuster 220 can adjust the power supplied from the external power source or the battery 189 into a voltage level or current level appropriate for each of some of the components included in the electronic device 101. According to an embodiment, the power adjuster 220 can be implemented in the form of a low drop out (LDO) regulator or a switching regulator. The power gauge 230 can measure use state information about the battery 189 (e.g., a capacity, a number of times of charging or discharging, a voltage, or a temperature of the battery 189).

The power management module 188 can determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information. The power management module 188 may determine whether the state of the battery 189 is normal or abnormal based at least in part on the determined charging state information. When the state of the battery 189 is determined to abnormal, the power management module 188 can adjust the charging of the battery 189 (e.g., reduce the charging current or voltage, or stop the charging). According to an embodiment, at least some of the functions of the power management module 188 can be performed by an external control device (e.g., the processor 120).

The battery 189, according to an embodiment, can include a protection circuit module (PCM) 240. The PCM 240 can perform one or more of various functions (e.g., a pre-cutoff function) to prevent a performance deterioration of, or a damage to, the battery 189. The PCM 240, additionally or alternatively, can be configured as at least part of a battery management system (BMS) capable of performing various functions including cell balancing, measurement of battery capacity, measurement of count of the number of charging or discharging, measurement of temperature, or measurement of voltage.

According to an embodiment, at least part of the use state information or charging state information regarding the battery 189 can be measured using a corresponding sensor (e.g., a temperature sensor) of the sensor module 176, the power gauge 230, or the power management module 188. According to an embodiment, the corresponding sensor (e.g., a temperature sensor) of the sensor module 176 can be included as part of the PCM 240, or can be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
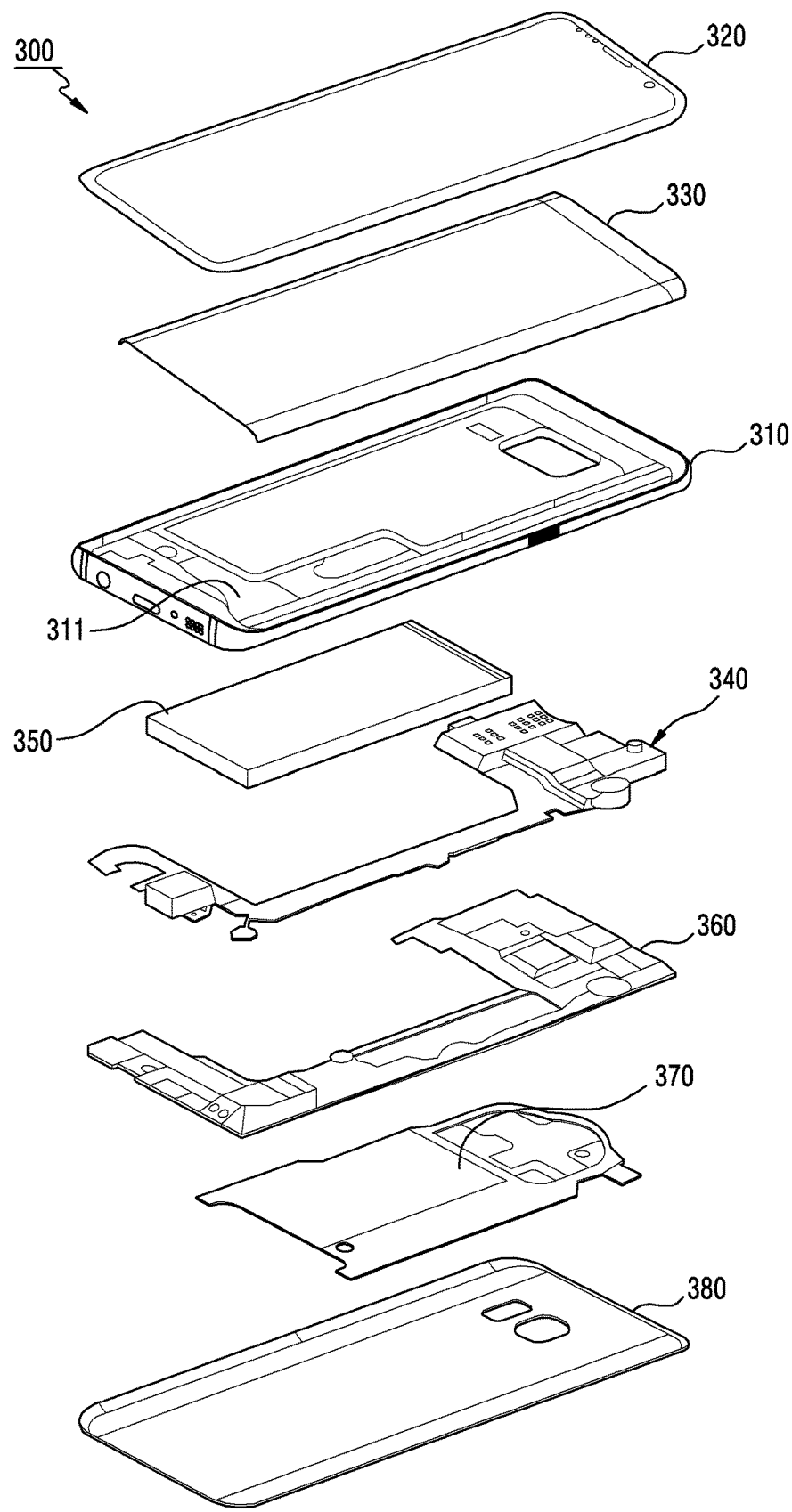
FIG. 3 is an exploded perspective diagram of an electronic device including a battery according to an embodiment.

FIG. 3 is an exploded perspective diagram of an electronic device including a battery according to an embodiment.

Referring to FIG. 3, the electronic device 300 (e.g., the electronic device 101 of FIG. 1) can include a side bezel structure 310, a first support member 311, a front plate 320, a display 330, a printed circuit board 340, a battery (or battery pack) 350 (e.g., the battery 189 of FIG. 1), a second support member 360 (e.g., a rear case), an antenna 370 (e.g., the antenna module 178 of FIG. 1), and a back plate 380. In some embodiment, the electronic device 300 may omit at least one (e.g., the second support member 360) of the components or additionally include another component.

According to an embodiment, the electronic device 300 can include a housing 320, 380 and 310 which includes a front surface (not shown), a rear surface (not shown), and a lateral surface (not shown) surrounding a space between the front surface and the rear surface. In another embodiment (not shown), the housing can indicate a structure forming some of the front surface, the rear surface and the lateral surface as well. According to an embodiment, the front surface can be formed by the front plate 320 (e.g., a glass plate including various coating layers, or a polymer plate) whose at least portion is substantially transparent. The rear surface can be formed by the substantially opaque back plate 380. The back plate 380 can be formed of, for example, a coated or colored glass, a ceramic, polymer, a metal (e.g., aluminum, a steel type stainless (STS) or magnesium), or a combination of at least two of the materials. The lateral surface can be formed by the side bezel structure (or "side member") 310 coupled with the front plate 320 and the back plate 380 and including metals and/or polymers. In some embodiment, the back plate 380 and the side bezel structure 310 can be integrally formed and can include the same materials (e.g., metal materials such as aluminum).

The first support member 311, for example, can be disposed within the electronic device 300 so as to be connected to the side bezel structure 310, or can be formed integrally with the side bezel structure 310. The first support member 311, for example, can be formed of metal materials and/or non-metal (e.g., polymer) materials. The first support member 311 can be coupled, at one surface, with the display 330, and be coupled, at the other surface, with the printed circuit board 340. The printed circuit board 340 can mount a processor, a memory, and/or an interface. The processor (e.g., the processor 120 of FIG. 1), for example, can include one or more of a central processing device, an application processor, a graphic processing device, an image signal processor, a sensor hub processor, or a communication processor.

The memory, for example, can include a volatile memory or a non-volatile memory.

The interface, for example, can include a high definition multimedia interface (HDMI), a universal serial bus (USB) interface, an SD card interface, and/or an audio interface. The interface, for example, can electrically or physically connect the electronic device 300 with an external electronic device, and can include a USB connector, an SD card/MMC connector, or an audio connector.

The battery 350 is a device for supplying power to at least one component of the electronic device 300 and, for example, can include a non-rechargeable primary cell, a rechargeable secondary cell, or a fuel cell. At least one portion of the battery 350, for example, can be disposed on the substantially same plane as the printed circuit board 340. The battery 350 can be disposed integrally within the electronic device 300, and can be arranged detachably with the electronic device 300 as well.

The antenna 370 can be disposed between the back plate 380 and the battery 350. The antenna 370, for example, can include a near field communication (NFC) antenna, a wireless charging antenna, and/or a magnetic secure transmission (MST) antenna. The antenna 370, for example, can perform short-range communication with an external device, or can wirelessly transmit and/or receive power required for charging. In another embodiment, an antenna structure can be formed by the side bezel structure 310 and/or one portion of the first support member 311 or a combination thereof.

Figure 4:
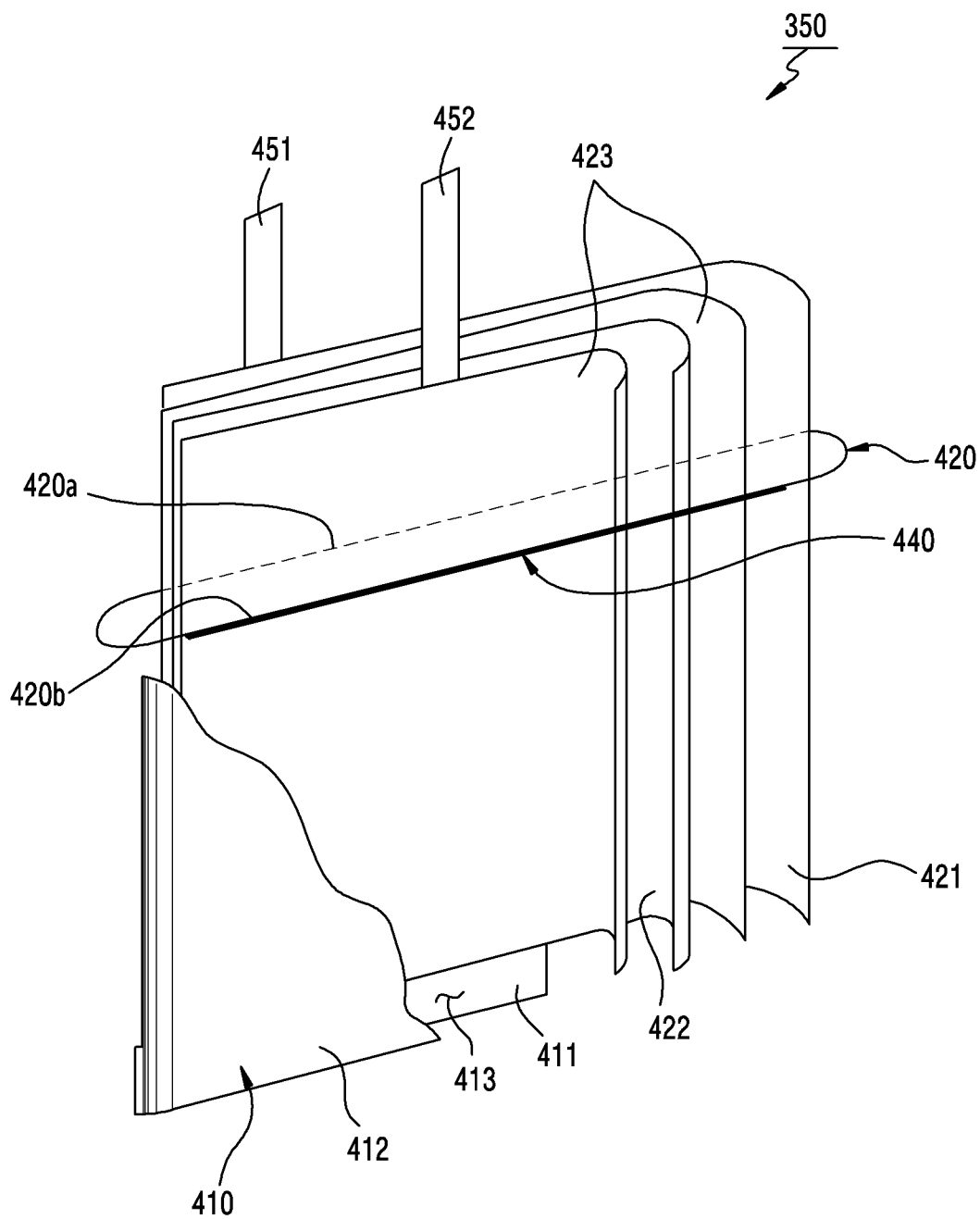
FIG. 4 schematically illustrates a structure of the battery included in the electronic device of FIG. 3.

FIG. 4 schematically illustrates a structure of the battery of FIG. 3.

Referring to FIG. 4, in an embodiment, the battery 350 can include at least one of a pouch 410, an electrode assembly 420, a second adhesive member 440, a positive electrode tab 451, or a negative electrode tab 452.

According to an embodiment, the pouch 410 (or a can) is a structure for preparing an internal space 413 where the electrode assembly 420 is received and, for example, can include a first plate 411 and a second plate 412 which are disposed to interpose the internal space 413 and be spaced apart from each other. According to an embodiment, the pouch 410 can be formed of a metal such as aluminum and an aluminum alloy.

According to an embodiment, the electrode assembly 420 is a structure prepared by a winding in which a positive electrode plate 421, a negative electrode plate 422 and a separator 423 are superposed and rolled up together and, for example, can have a jelly roll form. According to an embodiment, by a series of processes of disposing the electrode assembly 420 in the internal space 413 of the pouch 410 and then injecting an electrolyte and sealing, the electrode assembly 420 can be disposed in the internal space 413 of the pouch 410 together with the electrolyte.

The battery 350, for example, can convert chemical energy of the positive electrode plate 421 and the negative electrode plate 422 into electrical energy, and can supply a power source to corresponding circuitry (e.g., the power management module 188 of FIG. 2) via the positive electrode tab 451 connected to the positive electrode plate 421 and the negative electrode tab 452 connected to the negative electrode plate 422.

The positive electrode plate 421, for example, can include a positive electrode substrate, and a first bonding agent coated on the positive electrode substrate. A battery capacity and voltage can be determined by the positive electrode plate 421. The first bonding agent can include a positive electrode active material, a conducting agent and a binder. The positive electrode active material is material (e.g., NCM, NCA, LDO, etc.) participating in electrode reaction, and the conducting agent is material for enhancing conductivity, and the binder can enhance a bonding strength between the positive electrode active material and the conducting agent. According to an embodiment, the positive electrode plate 421 can include a coating region (not shown) where the first bonding agent is coated on the positive electrode substrate, and a non-coating region (e.g., an uncoated portion) (not shown) where the first bonding agent is not coated on the positive electrode substrate. According to an embodiment, the coating region can include a double sided coating region where the first bonding agent is coated on both surfaces of the positive electrode substrate, or a single sided coating region where the first bonding agent is coated on one surface of the positive electrode substrate.

According to an embodiment, the positive electrode substrate can be a plate or layer (e.g., an aluminum (Al) foil) including a metal such as aluminum, and the positive electrode active material can include a lithium-based oxide as the main component.

The negative electrode plate 422, for example, can include a negative electrode substrate, and a second bonding agent coated on the negative electrode substrate. According to an embodiment, the second bonding agent can include a negative electrode active material, a conducting agent and a binder. The negative electrode plate 422 can include a coating region (not shown) where the second bonding agent is coated on the negative electrode substrate, and a non-coating region (e.g., an uncoated portion) (not shown) where the second bonding agent is not coated on the negative electrode substrate. According to an embodiment, the coating region can include a double sided coating region where the second bonding agent is coated on both surfaces of the negative electrode substrate, or a single sided coating region where the second bonding agent is coated on one surface of the negative electrode substrate.

According to an embodiment, the negative electrode substrate can be a plate or layer (e.g., a copper (Cu) foil) including a metal such as copper, and the negative electrode active material can include carbon materials as the main component.

The electrolyte is a medium capable of allowing ions to move such that a reduction reaction, or an oxidation reaction, of the positive electrode plate 421 or the negative electrode plate 422 achieves chemical harmony. The electrolyte, for example, can include materials of states such as liquid, solid or gel. For example, at charging of the battery 350, by the oxidation of the positive electrode plate 421 and the reduction of the negative electrode plate 422, lithium ions come out from the positive electrode plate 421 and pass through the electrolyte and move to the negative electrode plate 422, and electrons can flow from the positive electrode plate 421 to the negative electrode plate 422 along circuitry (e.g., the power management module 188 of FIG. 2) connected with the positive electrode tab 451 and the negative electrode tab 452. For example, at discharging of the battery 350, by the reduction of the positive electrode plate 421 and the oxidation of the negative electrode plate 422, lithium ions come out from the negative electrode plate 422 and pass through the electrolyte and move to the positive electrode plate 421, and electrons can flow from the negative electrode plate 422 to the positive electrode plate 421 along the circuitry (e.g., the power management module 188 of FIG. 2) connected with the positive electrode tab 451 and the negative electrode tab 452. At discharging, the battery 350 can convert chemical energy of the positive electrode active material of the positive electrode plate 421 and the negative electrode active material of the negative electrode plate 422 and the electrolyte into electrical energy, and can supply a power source to corresponding circuitry (e.g., the power management module 188 of FIG. 2) via the positive electrode tab 451 connected to the positive electrode plate 421 and the negative electrode tab 452 connected to the negative electrode plate 422.

The separator 423, for example, can be an isolator disposed between the positive electrode plate 421 and the negative electrode plate 422 and preventing a physical contact between the positive electrode plate 421 and the negative electrode plate 422. The separator 423 can prevent short between the positive electrode plate 421 and the negative electrode plate 422, and make the movement of ions possible. The separator 423 can allow ions to move through a minute hole to thereby make the flow of charges possible, and can be formed of various materials to have porosity. According to an embodiment, the separator 423 can include at least one of polyethylene (PE) or polypropylene (PP). For example, the separator 423 can be formed as a single layer including polyethylene (PE), or a single layer including polypropylene (PP). For example, the separator 423 can be formed as two layers binding a polyethylene (PE) layer and a polypropylene (PP) layer. For example, the separator 423 can be formed as three layers bonding a polypropylene (PP) layer, a polyethylene (PE) layer and a polypropylene (PP) layer.

According to an embodiment, the rolled up outer surface (not shown) of the electrode assembly 420 of a jelly roll form can be formed by the positive electrode plate 421. At least one portion of one end (not shown) of the positive electrode plate 421 can be fixed to the outer surface of the electrode assembly 420, and the other end (not shown) of the positive electrode plate 421 can be disposed inside the electrode assembly 420. According to an embodiment, the battery 350 can include a first adhesive member (not shown) for fixing the at least portion of the one end of the positive electrode plate 421 (e.g., an edge of the non-coating region in the positive electrode plate 421) to the outer surface of the electrode assembly 420. The first adhesive member can allow the electrode assembly 420 to be maintained in the jelly roll form. For example, the first adhesive member can be disposed between the first plate 411 of the pouch 410 and a first surface 420a of the electrode assembly 420 facing the first plate 411.

According to an embodiment, the electrode assembly 420 can be fixed inside the pouch 410. According to an embodiment, the second adhesive member 440 can be disposed between the outer surface of the electrode assembly 420 and an inner surface of the pouch 410 such that the electrode assembly 420 is in the internal space 413 of the pouch 410 without movement or shaking.

According to an embodiment, the second adhesive member 440 is adhesive materials or cohesive materials disposed between the pouch 410 and the electrode assembly 420, and can offer coupling between the electrode assembly 420 and the pouch 410.

According to an embodiment, the second adhesive member 440 can be formed by a binder. The binder, for example, can include various materials capable of implementing an adhesive strength between the pouch 410 and the electrode assembly 420. According to an embodiment, the second adhesive member 440 can be disposed in the form of a thin film between the electrode assembly 420 and the pouch 410. For example, in response to the binder being coated on the outer surface of the electrode assembly 420 in a pattern of a dot form and thereafter the electrode assembly 420 and the pouch 410 being compressed, the second adhesive member 440 including the binder can exist between the electrode assembly 420 and the pouch 410 in the form of the thin film. According to various embodiments, the second adhesive member 440 can be formed of various materials mixing the binder as well.

According to an embodiment, the second adhesive member 440 formed by the binder can, compared to an adhesive member (e.g., a double-sided tape) of a form in which adhesive materials are coated on a substrate, be disposed as a single layer without a substrate, so relatively film thinning can be possible. For example, the second adhesive member 440 can be formed by a thin film having a thickness of about 5 to 50 micrometers (μm), to contribute to a decrease of a thickness of the battery 350.

According to various embodiments, the second adhesive member 440 can be offered as a film of a single layer form including the binder and be attached to the outer surface of the electrode assembly 420 as well.

The second adhesive member 440, for example, can couple the pouch 410 and the electrode assembly 420 at a region other than a region where the first adhesive member is disposed among the outer surface of the electrode assembly 420. According to an embodiment, the second adhesive member 440 can be disposed along at least one portion of a second surface 420b of the electrode assembly 420 facing a second plate 412 of the pouch 410.

Figure 5:
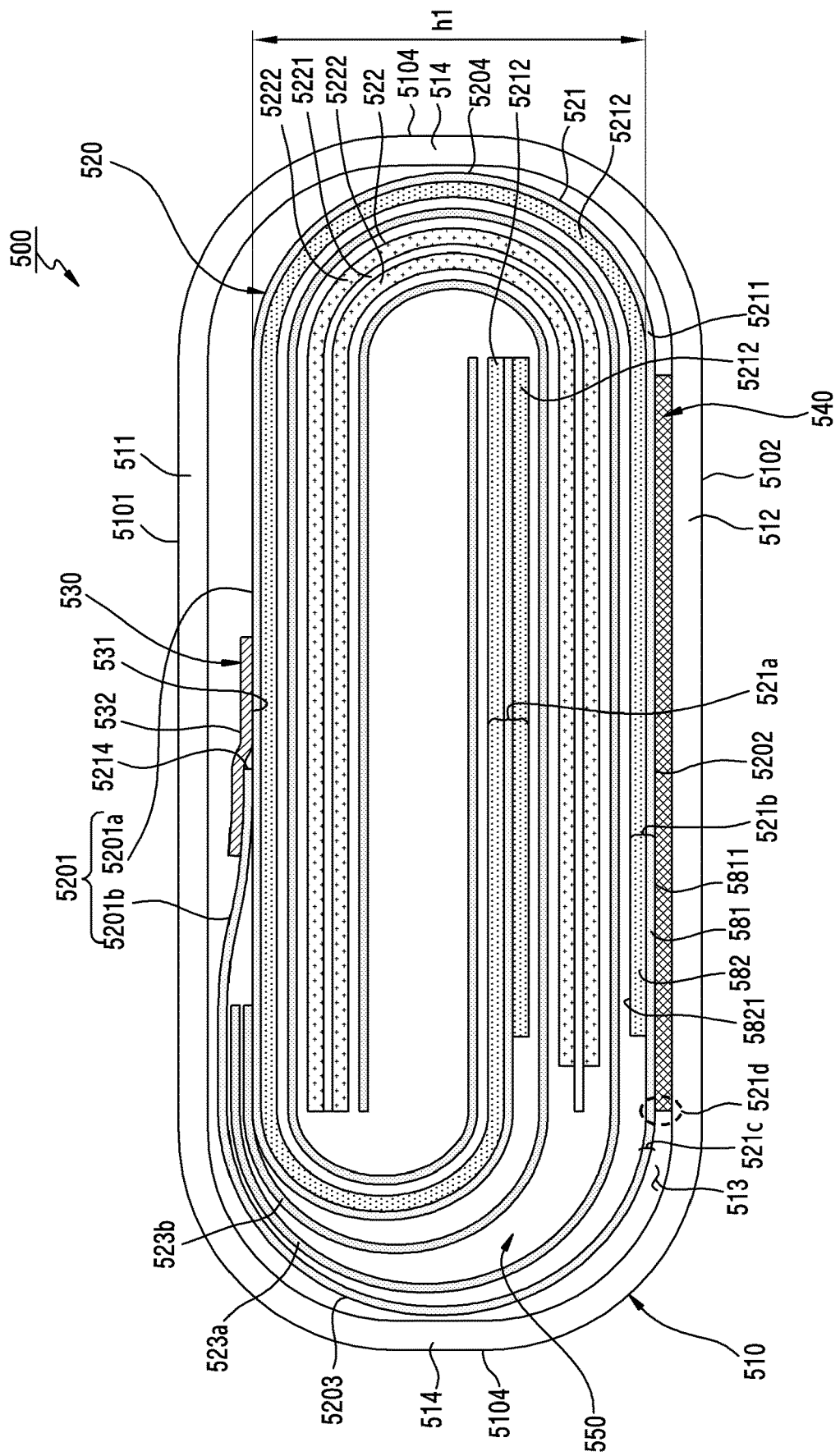
FIG. 5 illustrates a cross section of a battery according to an embodiment.
Figure 6A:
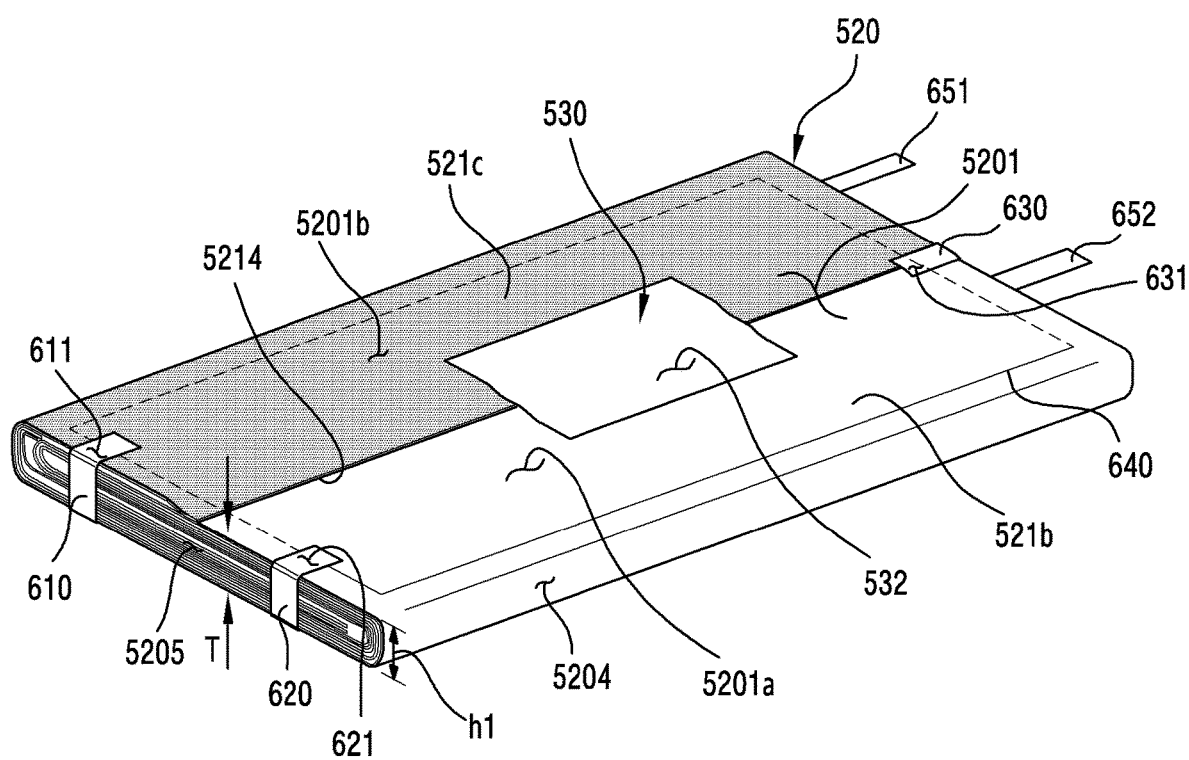
FIG. 6A is a front perspective diagram of an electrode assembly according to an embodiment.
Figure 6B:
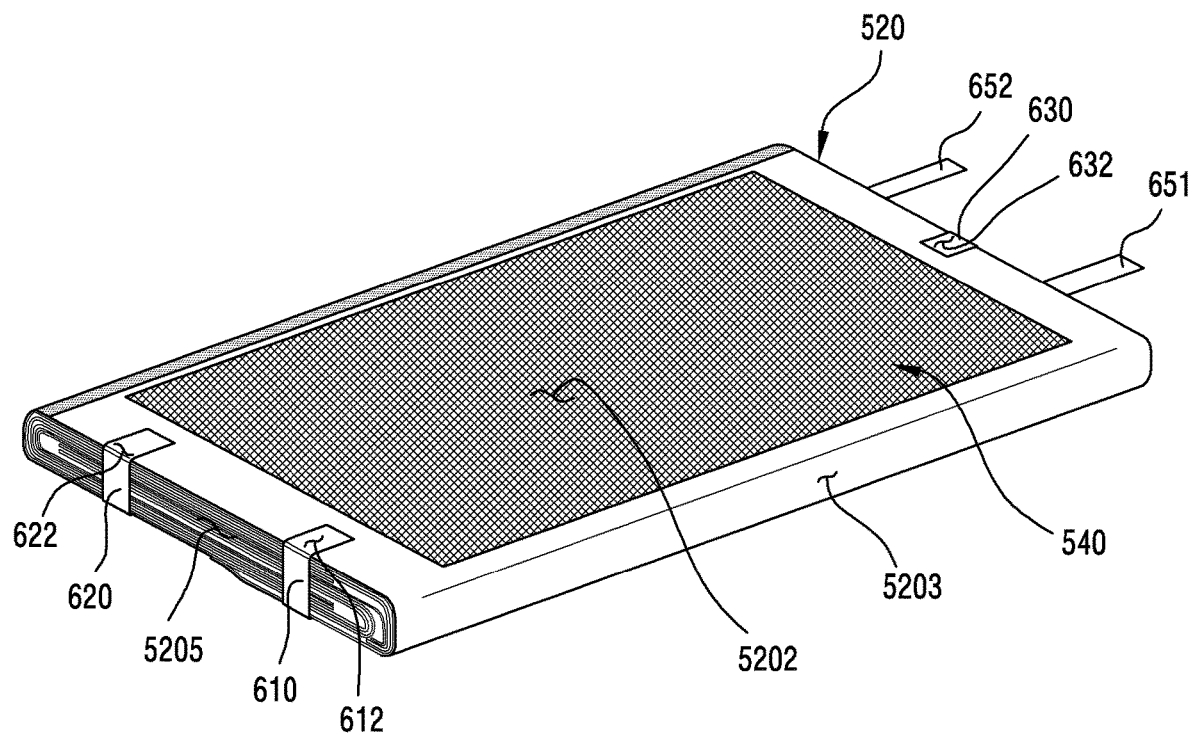
FIG. 6B is a rear perspective diagram of the electrode assembly of FIG. 6A.

FIG. 5 illustrates a cross section of a battery according to an embodiment. FIG. 6A is a front perspective diagram of an electrode assembly according to an embodiment. FIG. 6B is a rear perspective diagram of the electrode assembly of FIG. 6A.

Referring to FIG. 5, the battery 500 (e.g., the battery 350 of FIG. 3 or 4) can include at least one of a pouch 510 (e.g., the pouch 410 of FIG. 4), an electrode assembly 520 (e.g., the electrode assembly 420 of FIG. 4), a first adhesive member 530 or a second adhesive member 540 (e.g., the second adhesive member 440 of FIG. 4).

According to an embodiment, the pouch 510 is a structure having an internal space 513 (e.g., the internal space 413 of FIG. 4) in which the electrode assembly 520 is received, and can include a first plate 511 (e.g., the first plate 411 of FIG. 4) and a second plate 512 (e.g., the second plate 412 of FIG. 4) disposed to interpose the internal space 513 and be spaced apart from each other. The pouch 510 can include a lateral wall 514 surrounding the internal space 513 between the first plate 511 and the second plate 512, and the lateral wall 514 can be formed integrally with the first plate 511. An outer surface of the battery 500 can include a front surface 5101 formed by the first plate 511 and going in a first direction (not shown), and a rear surface 5102 formed by the second plate 512 and going in a second direction opposite to the first direction, and a lateral surface 5104 formed by the lateral wall 514. For example, by a series of processes of disposing the electrode assembly 520 in a recess (not shown) formed by the first plate 511 and the lateral wall 514, and injecting an electrolyte 550 into the internal space 513 prepared by coupling the first plate 511 and the second plate 512, and sealing, the electrode assembly 520 can be disposed in the internal space 513 of the pouch 510 together with the electrolyte 550. According to various embodiments, the pouch 510 can be offered in various other forms to offer the internal space 513 where the electrode assembly 520 and the electrolyte 550 are received.

According to various embodiments, the pouch 510 is a member offering the internal space 513 receiving the electrode assembly 520 and the electrolyte 550, and can be replaced with various other terms such as a 'can', a 'case', a 'housing', 'exterior materials', etc. According to various embodiments, the pouch 510 can be formed of metals such as aluminum or non-metals such as polymer. According to various embodiments, the pouch 510 can be formed of materials having flexibility as well.

According to various embodiments, the battery is not limited to the form shown in FIG. 5 and can be formed in various other forms. For example, the battery can include a cylindrical pouch, and an electrode assembly of a form of being rolled up within the pouch in a circular shape. The battery can be formed in various other forms in addition to this.

According to an embodiment, the electrode assembly 520 can be disposed within the internal space 513 of the pouch 510 in a state (e.g., a jelly roll) where a positive electrode plate 521 (e.g., the positive electrode plate 421 of FIG. 4), a negative electrode plate 522 (e.g., the negative electrode plate 422 of FIG. 4), and one or more separators 523a and 523b (e.g., the separator 423 of FIG. 4) disposed in at least a portion between the positive electrode plate 521 and the negative electrode plate 522 are rolled up together. The positive electrode plate 521, for example, can include a positive electrode substrate 5211 (e.g., an aluminum foil), and a first bonding agent 5212 coated on the positive electrode substrate 5211. The first bonding agent 5212 can include a positive electrode active material, a conducting agent, and a binder, and the positive electrode active material can include a lithium-based oxide as the main component. According to an embodiment, the first bonding agent 5212 and some of the separators 523a and 523b facing this can be bonded to each other by a binder component of the separators 523a and 523b. In FIG. 5, for the sake of the understanding of the structure of the electrode assembly 520, it is illustrated that the first bonding agent 5212 of the positive electrode plate 521 and the separators 523a and 523b facing this are separated from each other, but substantially the first bonding agent 5212 of the positive electrode plate 521 can be bonded to some of the separators 523a and 523b facing this.

According to an embodiment, the positive electrode plate 521 can include coating regions 521a and 521b where the first bonding agent 5212 is coated on the positive electrode substrate 5211, and a non-coating region (e.g., an uncoated portion) 521c where the first bonding agent 5212 is not coated on the positive electrode substrate 5211. The coating regions 521a and 521b can include a double sided coating region 521a where the first bonding agent 5212 is coated on all of both surfaces of the positive electrode substrate 5211, and a single sided coating region 521b where the first bonding agent 5212 is coated on one surface of the positive electrode substrate 5211. In the positive electrode plate 521, the single sided coating region 521b can be disposed between the double sided coating region 521a and the non-coating region 521c.

According to an embodiment, one portion of the single sided coating region 521b of the positive electrode plate 521 and the non-coating region 521c can form the outermost turn of the electrode assembly 520, and the positive electrode substrate 5211 can form at least one portion of an outer surface of the electrode assembly 520. The outer surface of the electrode assembly 520 can include a first surface 5201 facing the first plate 511 of the pouch 510, a second surface 5202 facing the second plate 512 of the pouch 510, and a first lateral surface 5203 and a second lateral surface 5204 facing both lateral surfaces 514 of the pouch 510 respectively.

According to an embodiment, the first surface 5201 of the electrode assembly 520 can include a surface 5201a formed by the single sided coating region 521b, and a surface 5201b formed by the non-coating region 521c. The first lateral surface 5203 of the electrode assembly 520 can be formed by the non-coating region 521c of the positive electrode plate 521. The second surface 5202 of the electrode assembly 520 can be formed by the non-coating region 521c, and the single sided coating region 521b, of the positive electrode plate 521. A second lateral surface 5204 of the electrode assembly 520 can be formed by the single sided coating region 521b of the positive electrode plate 521. According to various embodiments, a position 521d between the non-coating region 521c and the single sided coating region 521b can be changed such that the single sided coating region 521b forms one portion of the first lateral surface 5203.

Referring to FIGS. 5 and 6A, in an embodiment, at least one portion of one end (e.g., one end 5214 of the non-coating region 521c) of the positive electrode plate 521 can be fixed by the first adhesive member 530 to the first surface 5201 of the electrode assembly 520. The first adhesive member 530 can be attached to the first surface 5201 to cover a partial region of the surface 5201a formed by the single sided coating region 521b among the first surface 5201, and a partial region of the surface 5201b formed by the non-coating region 521c among the first surface 5201. In response to at least one portion of the one end 5214 of the positive electrode plate 521 being fixed by the first adhesive member 530 to the first surface 5201, the electrode assembly 520 can be maintained in a jelly roll form.

According to an embodiment, the surface 5201a formed by the single sided coating region 521b among the first surface 5201 can be spaced apart from the second surface 5202 substantially as much as a first height (h1). Due to a winding structure of the electrode assembly 520, the surface 5201b formed by the non-coating region 521c among the first surface 5201 can be spaced apart from the second surface 5202 by a height larger than the first height (h1). According to an embodiment, the first surface 5201 includes a portion changed from the outermost turn to the next turn among the winding structure and thus, compared to the second surface 5202, may not be flat. According to an embodiment, the first adhesive member 530 can be a flexible adhesive or cohesive film which can be disposed along the surfaces 5201a and 5201b having a height difference of the first surface 5201.

In an embodiment, referring to FIGS. 5 and 6A, the first adhesive member 530 can include a third surface 531 coupled to face the first surface 5201 of the electrode assembly 520, and a fourth surface 532 facing the third surface 531. The third surface 531 can include various adhesive materials or cohesive materials for coupling with the first surface 5201. According to an embodiment, the fourth surface 532 can include materials (e.g., a releasing agent or a stripping agent) not having an affinity with the adhesive materials or cohesive materials. For example, a tape in which the cohesive materials (or adhesive materials) are disposed in one surface and materials not having an affinity with the cohesive materials are disposed in the opposite surface can be offered in the form of rolling up, and this can make it easy to take away, when untying, the tape. By using this tape, the first adhesive member 530 can be prepared in the battery 500.

Referring to FIGS. 6A and 6B, in an embodiment, the electrode assembly 520 can include a third lateral surface 5205 and a fourth lateral surface (not shown) which are disposed in a direction orthogonal with the first lateral surface 5203 and the second lateral surface 5204 at both sides respectively. For example, a winding structure between the positive electrode plate 521, the negative electrode plate 522 and one or more separators 523a and 523b of FIG. 5 can be exposed through the third lateral surface 5205 or the fourth lateral surface.

Referring to FIGS. 6A and 6B, in an embodiment, the electrode assembly 520 can further include one or more adhesive members 610, 620 and 630 for allowing the electrode assembly 520 to be maintained in a jelly roll form. For example, the one adhesive member 610 can include one end portion 611 disposed across the third lateral surface 5205 and coupled to the surface 5201b formed by the non-coating region 521c among the first surface 5201, and the other end portion 612 coupled to the second surface 5202. The another adhesive member 620 can include one end portion 621 disposed across the third lateral surface 5205 and coupled to the surface 5201a formed by the single sided coating region 521b among the first surface 5201, and the other end portion 622 coupled to the second surface 5202. The further another adhesive member 630 can include one end portion 631 disposed across the fourth lateral surface and coupled to all of the surface 5201b formed by the non-coating region 521c among the first surface 5201 and the surface 5201a formed by the single sided coating region 521b, and the other end portion 632 coupled to the second surface 5202. According to an embodiment, the adhesive members 610, 620 and 630 can not only prevent a swelling of the non-coating region 521c forming the first surface 5201, but also allow the electrode assembly 520 to be maintained at a corresponding thickness (T) (e.g., a height of the electrode assembly 520 between the first plate 511 and the second plate 512 in FIG. 5).

According to an embodiment, the adhesive members 610, 620 and 630, similarly with the first adhesive member 530, can dispose, in one surface, adhesive materials or cohesive materials for coupling with the first surface 5201, and dispose, in the opposite surface, materials not having an affinity with the adhesive materials or cohesive materials.

Referring to FIG. 5, in an embodiment, the first adhesive member 530 can be disposed between the first plate 511 of the pouch 510 and the first surface 5201 of the electrode assembly 520 facing the first plate 511.

The negative electrode plate 522, for example, can include a negative electrode substrate 5221 (e.g., a copper foil), and a second bonding agent 5222 coated along at least one portion of the negative electrode substrate 5221. The second bonding agent 5222 can include a negative electrode active material, a conducting agent, and a binder and, for example, a negative electrode oxide can include carbon materials as the main component. According to an embodiment, the second bonding agent 5222 and some of the separators 523a and 523b facing this can be bonded to each other by a binder component of the separators 523a and 523b. In FIG. 5, for the sake of the understanding of a structure of the electrode assembly 520, it is illustrated that the second bonding agent 5222 of the negative electrode plate 522 and the separators 523a and 523b facing this are separated from each other, but substantially the second bonding agent 5222 of the negative electrode plate 522 can be bonded to some of the separators 523a and 523b facing this.

The electrolyte 550, for example, can be a medium capable of allowing ions to move such that, at charging or discharging of the battery 500, a reduction reaction, or an oxidation reaction, of the positive electrode plate 521 and the negative electrode plate 522 achieves chemical harmony. At discharging, the battery 500 can convert chemical energy of the positive electrode active material 5212 of the positive electrode plate 521, the negative electrode active material 5222 of the negative electrode plate 522 and the electrolyte 550 into electrical energy, and can supply a power source to corresponding circuitry (e.g., the power management module 188 of FIG. 2) through a positive electrode tab 651 (referring to FIG. 6A or 6B) (e.g., the positive electrode tab 451 of FIG. 4) connected to the positive electrode plate 521 and a negative electrode tab 652 (referring to FIG. 6A or 6B) (e.g., the negative electrode tab 452 of FIG. 4) connected to the negative electrode plate 522.

One or more separators 523a and 523b, for example, can be an isolator disposed between the positive electrode plate 521 and the negative electrode plate 522, and preventing a physical contact between the positive electrode plate 521 and the negative electrode plate 522. One or more separators 523a and 523b can prevent short between the positive electrode plate 521 and the negative electrode plate 522, and make the movement of ions possible.

According to an embodiment, the second adhesive member 540 can be disposed between an outer surface of the electrode assembly 520 and an inner surface of the pouch 510, such that the electrode assembly 520 is in the internal space 513 of the pouch 510 without movement or shaking. According to an embodiment, the second adhesive member 540 can include various adhesive materials or cohesive materials disposed between the pouch 510 and the electrode assembly 520. According to an embodiment, unlike an adhesive member (e.g., a double-sided tape) of a form in which adhesive materials are coated on a substrate, the second adhesive member 540 can be coated, without a substrate, on the outer surface of the electrode assembly 520. For example, the second adhesive member 540 can be coated using a brush, a roller, or a spray, and various devices or methods possible to form the second adhesive member 540 by a thin film, such as a comma coater, a gravure coater, a die coater, a spray coater, an electro spinning coater, etc., can be utilized.

According to an embodiment, the second adhesive member 540 can be formed by a thickness of about 5 to 50 micrometers (μm), or can be formed by various thicknesses different from this.

The adhesive materials or cohesive materials utilized for the second adhesive member 540, for example, can include at least one of an acrylic base including polyacrylate, a fluorine-based resin such as polyvinylidene fluoride (PVdF), or a rubber base represented by a styrene butadiene rubber. According to various embodiments, the second adhesive member 540 can utilize natural polymer materials such as maleic acid, Arabic gum, Guar gum, chitosan, polydopamine, etc. According to various embodiments, the second adhesive member 540 can include a binder of various adhesive materials or cohesive materials.

According to an embodiment, the second adhesive member 540 can couple the pouch 510 and the electrode assembly 520 at a region other than a region where the first adhesive member 530 is disposed among the outer surface of the electrode assembly 520. Referring to FIGS. 5 and 6B, in an embodiment, the second adhesive member 540 can be disposed along at least one portion of the second surface 5202 of the electrode assembly 520 facing the second plate 512 of the pouch 510.

According to an embodiment, the second adhesive member 540 can be disposed in not the first surface 5201 but the second surface 5202, so a coupling area between the pouch 510 and the electrode assembly 520 and a coupling strength dependent on this can be secured. For example, assuming that the second adhesive member is disposed in not the second surface 5202 but the first surface 5201, due to surfaces 5201a and 5201b of mutually different heights of the first surface 5201, it can be difficult that the coupling area between the pouch 510 and the electrode assembly 520 is secured. For example, assuming that the second adhesive member 540 is disposed in not the second surface 5202 but the first surface 5201, the fourth surface 532 of the first adhesive member 530 attached to the first surface 5201 can include materials (e.g., a releasing agent or a stripping agent) not having an affinity with the second adhesive member 540, and a region covering the fourth surface 532 among the second adhesive member 540 can decrease the coupling area between the pouch 510 and the electrode assembly 520 to decrease the coupling strength thereof. For example, assuming that the second adhesive member is formed on not the second surface 5202 but the first surface 5201 by a thin film of a thickness of about 5 to 50 µm, the thin film can be coated along the first surface 5201 evenly, but due to the surfaces 5201a and 5201b of mutually different heights included in the first surface 5201, it can be difficult that a coupling area between the thin film and the first plate 511 is secured. By increasing the thickness of the thin film, the coupling area between the thin film and the first plate 511 can be secured, but this can increase a thickness of the battery 500. According to an embodiment, the second adhesive member 540 can be disposed in the second surface 5202 more even than the first surface 5201 in the form of a thin film, to contribute to a decrease of the thickness of the battery 500 and the securing of the coupling area or coupling strength between the second plate 512 of the pouch 510 and the electrode assembly 520.

For example, referring to FIG. 6A, assuming that the second adhesive member is disposed in not the second surface 5202 but the first surface 5201 (e.g., referring to a region 640 indicated by a dotted line), a coupling strength between the surface 5201b formed by the non-coating region 521c and the pouch 510 can be secured, but due to a height difference between the surfaces 5201a and 5201b, it can be difficult that a coupling strength between the surface 5201a formed by the single sided coating region 521b and the pouch 510 is secured. When an electronic device including the battery in which the second adhesive member is disposed in the first surface 5201 is fallen, its shock or stress can be focused too much on a junction portion between the surface 5201b formed by the non-coating region 521c and the pouch 510. By this, a danger of, due to a provision of a crack of the positive electrode plate 521 or a tear or breakage of the separator 523a or 523b, providing short between the positive electrode plate and the negative electrode plate can be high.

According to an embodiment, the second adhesive member 540 can be disposed in not the first surface 5201 but the second surface 5202, so the coupling area between the second surface 5202 and the pouch 510 and the coupling strength thereof can be secured. When an electronic device (e.g., the electronic device 300 of FIG. 3) including the battery 500 in which the second adhesive member 540 is disposed in the second surface 5202 is fallen, its shock or stress can be distributed in a junction portion between the second surface 5202 and the pouch 510 and, owing to this, a possibility of a damage to the battery 500 can be decreased.

In an embodiment, referring to FIG. 5, the second adhesive member 540 can be disposed along the single sided coating region 521b of the positive electrode plate 521 forming at least one portion of the second surface 5202. A portion 581 of the positive electrode substrate 521 disposed along the second surface 5202 among the single sided coating region 521b of the positive electrode plate 521 can be coupled, by the second adhesive member 540, with the pouch 510. A portion 582 of the first bonding agent 5212 disposed along the second surface 5202 among the single sided coating region 521b of the positive electrode plate 521 can be bonded, by a binder component of the separator 523a, with the separator 523a. According to an embodiment, a both-side junction structure (or an inner and/or outer adhesive structure) in which both surfaces 5811 and 5821 of the portions 581 and 582 disposed along the second surface 5202 among the single sided coating region 521b are coupled between the separator 523a and the second plate 512 with the second plate 512 and the separator 523a respectively can decrease a possibility of a damage to the positive electrode substrate 521 by an external shock, or a stress, caused by a fall, etc. For example, assuming that the second adhesive member is substantially disposed in the non-coating region 521c of the positive electrode plate 521, a structure in which only one surface of the positive electrode substrate 5211 is joined by the second adhesive member with the pouch 510 is nothing but secured, so the possibility of the damage to the positive electrode substrate 521 can be high by an external shock, or a stress, caused by a fall, etc.

Referring to FIG. 6B, in an embodiment, the second adhesive member 540 can be disposed along a region which is not covered by the ends 612, 622 and 632 of the adhesive members 610, 620 and 630 among the second surface 5202. According to some embodiment, although not illustrated, the second adhesive member 540 can be extended to more cover at least one portion of the ends 612, 622 and 632 of the adhesive members 610, 620 and 630 as well.

Figure 7A:
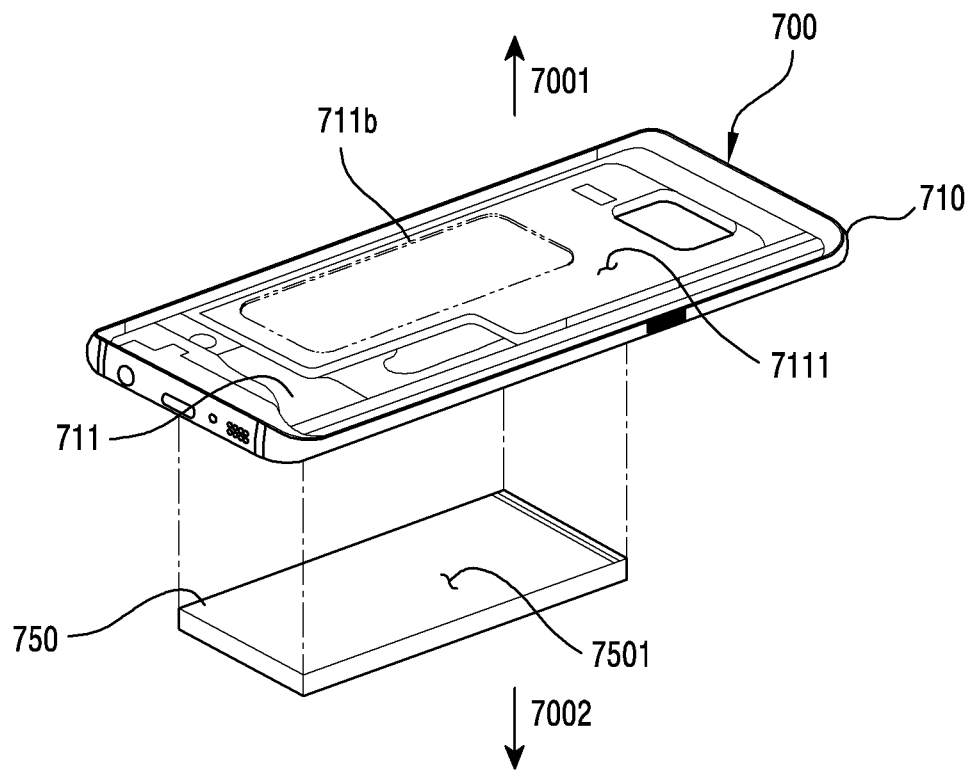
FIG. 7A illustrates a battery and a bracket according to an embodiment.
Figure 7B:
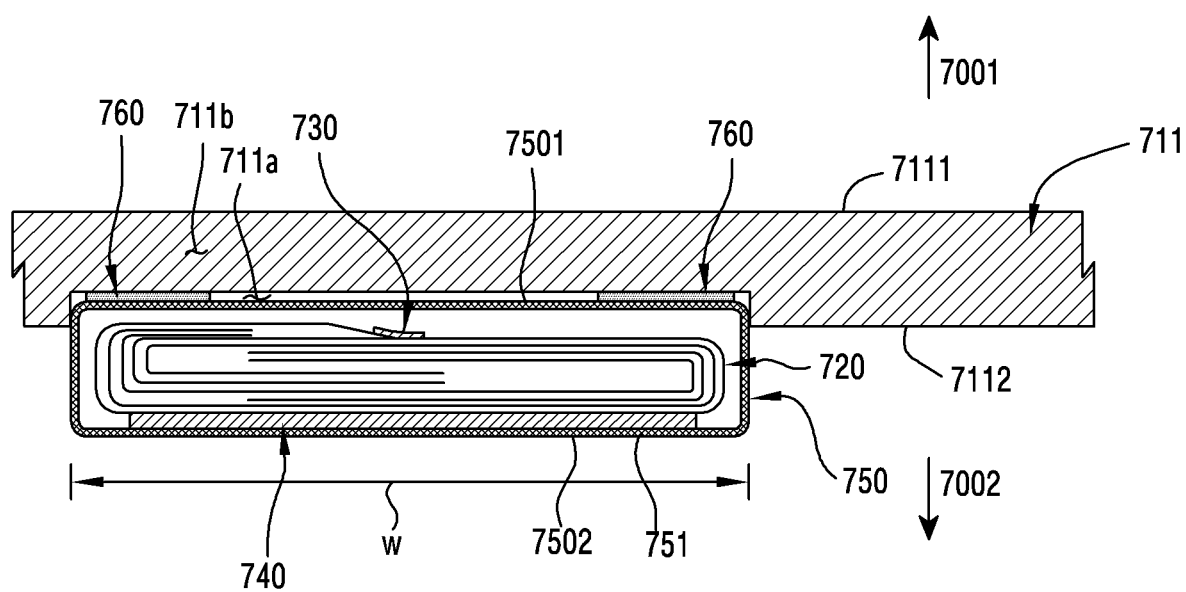
FIG. 7B is a cross section of a coupling structure between a battery and a bracket according to an embodiment.

FIG. 7A illustrates a battery and a bracket according to an embodiment. FIG. 7B is a cross section of a coupling structure between the battery and the bracket according to an embodiment.

Referring to FIGS. 7A and 7B, in an embodiment, the bracket 700 can include a support member 711 (e.g., the first support member 311 of FIG. 3) and a side bezel structure 710 (e.g., the side bezel structure 310 of FIG. 3). The support member 711 can be connected with the side bezel structure 710, or can be formed integrally with the side bezel structure 710. The first support member 711 can include a front surface 7111 going in a first direction 7001, and a rear surface 7112 going in a second direction 7002 facing away from the first direction 7001. A display (e.g., the display 330 of FIG. 3) can be coupled to the front surface 7111, and a printed circuit board (e.g., the printed circuit board 340 of FIG. 3) can be coupled to the rear surface 7112.

According to an embodiment, the battery 750 (e.g., the battery 500 of FIG. 5) can be coupled to the rear surface 7112 of the support member 711. The rear surface 7112 can be divided into a region (not shown) coupled to face the printed circuit board (e.g., the printed circuit board 340 of FIG. 3), and a region (not shown) coupled to face the battery 750.

According to an embodiment, the rear surface 7112 of the support member 711 can include a recess 711a of a burrowed form in the first direction 7001, and the battery 750 can be disposed in the recess 711a. The recess 711a can be formed by a size corresponding to a horizontal width or vertical width (W) of the battery 750. The battery 750 can be disposed in the recess 711a to be in the support member 711 without shaking.

According to an embodiment, the battery 750 can include a pouch 751 (e.g., the pouch 510 of FIG. 5) which includes a front surface 7501 (e.g., the front surface 5101 of FIG. 5) going in the first direction 7001 and a rear surface 7502 (e.g., the rear surface 5102 of FIG. 5) going in the second direction 7002. The battery 750 can include an electrode assembly 720 (e.g., the electrode assembly 520 of FIG. 5) which is received in the pouch 751 in a state in which a positive electrode substrate (e.g., the positive electrode substrate 521 of FIG. 5), a negative electrode substrate (e.g., the negative electrode substrate 522 of FIG. 5), and a separator (e.g., the separators 523a and 523b) disposed between the positive electrode substrate and the negative electrode substrate are rolled up together.

According to an embodiment, the battery 750 can include a first adhesive member 730 (e.g., the first adhesive member 530 of FIG. 5) fixing at least one portion of an end of the electrode assembly 720 to the rolled up outer surface of the electrode assembly 720. The first adhesive member 730 can allow the electrode assembly 720 to be maintained in a jelly roll state.

According to an embodiment, the battery 750 can include a second adhesive member 740 (e.g., the second adhesive member 540 of FIG. 5) offering fixing between the electrode assembly 720 and the pouch 710 at a region (e.g., the second surface 5202 of FIG. 5) other than a region (e.g., the first surface 5201 of FIG. 5) where the first adhesive member 730 is disposed. The second adhesive member 740 can allow the electrode assembly 720 to be in an internal space of the pouch 710 without movement or shaking. According to an embodiment, the second adhesive member 740 can be a thin film which is formed by coating the outer surface of the electrode assembly 720 with adhesive materials or cohesive materials (e.g., a binder).

According to an embodiment, the battery 750 can include a third adhesive member 760 offering fixing between a front surface 7501 of the pouch 710 facing the first adhesive member 730 and the support member 711. For example, the third adhesive member 760 can be disposed between the front surface 7501 of the pouch 710 and one surface (not shown) of the recess 711a facing the front surface 7501. The third adhesive member 760 can prevent the battery 750 from being separated from the recess 711a of the support member 711, and can include various adhesive materials or cohesive materials (e.g., a double-sided tape). According to various embodiments, the third adhesive member 760 can be formed as a single layer including a binder, to contribute to a decrease of a thickness of an electronic device.

According to an embodiment, a junction structure in which a first junction surface (e.g., the second adhesive member 740) between the electrode assembly 720 of the battery 750 and the pouch 710, and a second junction surface (e.g., the third adhesive member 760) between the battery 750 and the support member 711 interpose the electrode assembly 720 and are prepared at both sides respectively can decrease a possibility of a damage to the battery 750, when the electronic device (e.g., the electronic device 300 of FIG. 3) including the battery 750 and the bracket 700 is fallen. For example, a shock or stress provided at falling are distributed to the first junction surface and the second junction surface which are disposed to interpose the electrode assembly 720 and thus may not be focused too much on the battery 750.

For example, assuming that the third adhesive member is disposed between the rear surface 7502 of the battery 750 and the support member 711, all of the first junction surface between the electrode assembly 720 of the battery 750 and the pouch 710, and the second junction surface between the battery 750 and the support member 711 can be disposed between the electrode assembly 720 and the support member 711. When the electronic device (e.g., the electronic device 300 of FIG. 3) including the battery 750 and the bracket 700 is fallen, its shock or stress can be focused too much on one side (e.g., the first junction surface and the second junction surface) of the electrode assembly 720, to increase a possibility of a damage to the battery 750. According to an embodiment, the junction structure in which the first junction surface (e.g., the second adhesive member 740) between the electrode assembly 720 of the battery 750 and the pouch 710, and the second junction surface (e.g., the third adhesive member 760) between the battery 750 and the support member 711 interpose the electrode assembly 720 and are prepared at both sides respectively can decrease the possibility of the damage to the battery 750 by an external shock such as a fall.

According to an embodiment, the support member 711 can include an opening 711b following the recess 711a. A void space (e.g., a space having a thickness in the first direction 7001) formed by the opening 711b can be utilized for a use of preparing for a bulging phenomenon (e.g., swelling) of the battery 750. For example, by the bulging phenomenon, a thickness of at least one portion of the battery 750 can be increased, and the void space formed by the opening 711b can offer a space occupied by the portion of the battery 750 whose thickness is increased. According to an embodiment, the opening 711b can stop a display (e.g., the display 330 of FIG. 3) from being separated by the bulging phenomenon of the battery 750 from the support member 711, or the display and a front plate (e.g., the front plate 320 of FIG. 3) from being damaged (e.g., breakage, etc. caused by a pressure applied by the battery 750 whose volume is increased).

According to an embodiment, as illustrated, the support member 711 can be formed in order not to include the opening 711b. Compared to where the support member 711 includes the opening 711b, this can allow to more secure a junction portion (or a junction region) (e.g., the third adhesive member 760) between the support member 711 and the front surface 7501 of the battery 750, to more increase a coupling strength between the support member 711 and the battery 750.

According to an embodiment of the present disclosure, a battery (e.g., the battery 500 of FIG. 5) can include a pouch (e.g., the pouch 510 of FIG. 5), and an electrode assembly (e.g., the electrode assembly 520 of FIG. 5) received in the pouch in a state in which a positive electrode substrate (e.g., the positive electrode substrate 5211 of FIG. 5), a negative electrode substrate (e.g., the negative electrode substrate 5221 of FIG. 5) disposed below the positive electrode substrate, and a separator (e.g., the separators 523a and 523b of FIG. 5) disposed between the positive electrode substrate and the negative electrode substrate are rolled up together. The battery can include a first adhesive member (e.g., the first adhesive member 530 of FIG. 5) for fixing at least one portion of one end (e.g., one end 5214 of FIG. 5) of the electrode assembly to the rolled up outer surface of the electrode assembly. The battery can include a 10 second adhesive member (e.g., the second adhesive member 540 of FIG. 5) for offering fixing between the electrode assembly and the pouch at a region (e.g., the second surface 5202 of FIG. 5) other than the region (e.g., the first surface 5201 of FIG. 5) where the first adhesive member is disposed.

According to an embodiment of the present disclosure, the second adhesive member (e.g., the second adhesive member 540 of FIG. 5) can include a binder coated on at least one portion of the other region (e.g., the second surface 5202 of FIG. 5).

According to an embodiment of the present disclosure, the second adhesive member (e.g., the second adhesive member 540 of FIG. 5) can have a thickness of 5 to 50 µm.

According to an embodiment of the present disclosure, the second adhesive member (e.g., the second adhesive member 540 of FIG. 5) can include adhesive materials corresponding to at least one of an acrylic base, a fluorine-based resin or a rubber base.

According to an embodiment of the present disclosure, the second adhesive member (e.g., the second adhesive member 540 of FIG. 5) can include polymer materials including at least one of maleic acid, Arabic gum, Guar gum, chitosan, or polydopamine.

According to an embodiment of the present disclosure, the outer surface of the electrode assembly (e.g., the electrode assembly 520 of FIG. 5) can include a first surface (e.g., the first surface 5201 of FIG. 5) and a second surface (e.g., the second surface 5202 of FIG. 5) facing away from the first surface, and the first adhesive member (e.g., the first adhesive member 530 of FIG. 5) can be disposed in the first surface, and the second adhesive member (e.g., the second adhesive member 540 of FIG. 5) can be disposed in the second surface.

According to an embodiment of the present disclosure, the pouch (e.g., the pouch 510 of FIG. 5) can include a first plate (e.g., the first plate 511 of FIG. 5) facing the first surface (e.g., the first surface 5201 of FIG. 5), and a second plate (e.g., the second plate 512 of FIG. 5) facing the second surface (e.g., the second surface 5202 of FIG. 5). The second adhesive member (e.g., the second adhesive member 540 of FIG. 5) can be disposed between the second surface and the second plate.

According to an embodiment of the present disclosure, the first adhesive member (e.g., the first adhesive member 530 of FIG. 5) can be superposed and disposed to cover the at least one portion of the one end (e.g., one end 5214 of FIG. 5) and at least one portion of the outer surface, together.

According to an embodiment of the present disclosure, the first adhesive member (e.g., the first adhesive member 530 of FIG. 5) can be disposed to cover a portion which is changed from the outermost turn of the electrode assembly (e.g., the electrode assembly 520 of FIG. 5) to the next turn.

According to an embodiment of the present disclosure, the first adhesive member (e.g., the first adhesive member 530 of FIG. 5) can include a surface (e.g., the third surface 531 of FIG. 5) including adhesive materials facing the outer surface of the electrode assembly (e.g., the electrode assembly 520 of FIG. 5), and a surface (e.g., the fourth surface 532 of FIG. 5) facing the pouch (e.g., the pouch 510 of FIG. 5) and having materials not having an affinity with the adhesive materials.

According to various embodiments of the present disclosure, an electronic device (e.g., the electronic device of FIG. 3) can include a bracket (e.g., the bracket 700 of FIG. 7A), and a battery (e.g., the battery 750 of FIG. 7B). The battery (e.g., the battery 500 of FIG. 5) can include a pouch (e.g., the pouch 510 of FIG. 5), and an electrode assembly (e.g., the electrode assembly 520 of FIG. 5) received in the pouch in a state in which a positive electrode substrate (e.g., the positive electrode substrate 5211 of FIG. 5), a negative electrode substrate (e.g., the negative electrode substrate 5221 of FIG. 5) disposed below the positive electrode substrate, and a separator (e.g., the separators 523a and 523b of FIG. 5) disposed between the positive electrode substrate and the negative electrode substrate are rolled up together. The battery can include a first adhesive member (e.g., the first adhesive member 530 of FIG. 5) for fixing at least one portion of one end (e.g., one end 5214 of FIG. 5) of the electrode assembly to the rolled up outer surface of the electrode assembly. The battery can include a second adhesive member (e.g., the second adhesive member 540 of FIG. 5 or the second adhesive member 740 of FIG. 7B) for offering fixing between the electrode assembly and the pouch at a region (e.g., the second surface 5202 of FIG. 5) other than the region (e.g., the first surface 5201 of FIG. 5) where the first adhesive member is disposed. The battery can include a third adhesive member (e.g., the third adhesive member 760 of FIG. 7B) for offering fixing between the outer surface of the pouch facing the first adhesive member (e.g., the first adhesive member 730 of FIG. 7B) and the bracket.

According to various embodiments of the present disclosure, the second adhesive member (e.g., the second adhesive member 540 of FIG. 5) can include a binder coated on at least one portion of the other region (e.g., the second surface 5202 of FIG. 5).

According to various embodiments of the present disclosure, the third adhesive member (e.g., the third adhesive member 760 of FIG. 7B) can include a double sided tape.

According to various embodiments of the present disclosure, the outer surface of the electrode assembly (e.g., the electrode assembly 520 of FIG. 5) can include a first surface (e.g., the first surface 5201 of FIG. 5) and a second surface (e.g., the second surface 5202 of FIG. 5) facing away from the first surface. The first adhesive member (e.g., the first adhesive member 530 of FIG. 5) can be disposed in the first surface, and the second adhesive member (e.g., the second adhesive member 540 of FIG. 5) can be disposed in the second surface.

According to various embodiments of the present disclosure, the pouch (e.g., the pouch 510 of FIG. 5) can include a first plate (e.g., the first plate 511 of FIG. 5) facing the first surface (e.g., the first surface 5201 of FIG. 5), and a second plate (e.g., the second plate 512 of FIG. 5) facing the second surface (e.g., the second surface 5202 of FIG. 5). The second adhesive member (e.g., the second adhesive member 540 of FIG. 5) can be disposed between the second surface and the second plate, and the third adhesive member (e.g., the third adhesive member 760 of FIG. 7B) can be disposed between the bracket (e.g., the support member 711 of FIG. 7B) and the first plate (e.g., the first plate 511 of FIG. 5).

According to various embodiments of the present disclosure, the bracket (e.g., the support member 711 of FIG. 7B) can be formed in a surface (e.g., the rear surface 7112 of FIG. 7B) facing the pouch (e.g., the touch 751 of FIG. 7B), and include a recess (e.g., the recess 711a of FIG. 7B) into which the pouch is fitted.

According to various embodiments of the present disclosure, the bracket (e.g., the support member 711 of FIG. 7B) can include an opening (e.g., the opening 711b of FIG. 7B) formed in the recess (e.g., the recess 711a of FIG. 7B) by penetrating the bracket.

According to various embodiments of the present disclosure, the electronic device (e.g., the electronic device 300 of FIG. 3) can further include a display (e.g., the display 330 of FIG. 3), and the bracket (e.g., the bracket 700 of FIG. 7A) can be disposed between the display and the battery (e.g., the battery 750 of FIG. 7B).

According to various embodiments of the present disclosure, the electronic device (e.g., the electronic device 300 of FIG. 3) can further include a first plate (e.g., the front plate 320 of FIG. 3) forming a front surface of the electronic device, and a second plate (e.g., the back plate 380 of FIG. 3) forming a rear surface of the electronic device. The display (e.g., the display 330 of FIG. 3) can be disposed between the first plate and the bracket, and be exposed through the first plate. The battery (e.g., the battery 350 of FIG. 3) can be disposed between the bracket and the second plate.

According to various embodiments of the present disclosure, the bracket can include a portion (e.g., the side bezel structure 310 of FIG. 3) surrounding a space between the first plate (e.g., the front plate 320 of FIG. 3) and the second plate (e.g., the back plate 380 of FIG. 3), and forming a lateral surface of the electronic device.

Various embodiments of the present disclosure disclosed in the specification and drawings just merely suggest specific examples so as to easily explain the technological content of an embodiment of the present disclosure and assist the understanding of the embodiment of the present disclosure, and do not intend to limit the scope of the embodiment of the present disclosure. Accordingly, the scope of various embodiments of the present disclosure should be construed as including all modified or changed forms drawn on the basis of the technological spirit of the various embodiments of the present disclosure, besides embodiments disclosed herein.

The invention claimed is:

1. A battery comprising:
a pouch;
an electrode assembly received in the pouch in a state in which a positive electrode substrate, a negative electrode substrate disposed below the positive electrode substrate, and a separator disposed between the positive electrode substrate and the negative electrode substrate are rolled up together;
a first adhesive member for fixing at least one portion of one end of the electrode assembly to the rolled up outer surface of the electrode assembly; and
a second adhesive member for offering fixing between the electrode assembly and the pouch at a region other than the region where the first adhesive member is disposed.

2. The battery of claim 1, wherein the second adhesive member comprises a binder coated on at least one portion of the other region.

3. The battery of claim 1, wherein the outer surface of the electrode assembly comprises a first surface and a second surface facing away from the first surface,
the first adhesive member is disposed in the first surface, and
the second adhesive member is disposed in the second surface.

4. The battery of claim 3, wherein the pouch comprises a first plate facing the first surface, and a second plate facing the second surface, and
the second adhesive member is disposed between the second surface and the second plate.

5. The battery of claim 1, wherein the first adhesive member is superposed and disposed to cover the at least one portion of the one end and at least one portion of the outer surface, together.

6. The battery of claim 1, wherein the first adhesive member is disposed to cover a portion which is changed from the outermost turn of the electrode assembly to the next turn.

7. The battery of claim 1, wherein the first adhesive member comprises:
a surface facing the outer surface of the electrode assembly and comprising adhesive materials; and
a surface facing the pouch and having materials not having an affinity with the adhesive materials.

8. An electronic device comprising:
a bracket; and
a battery,
wherein the battery comprises:
a pouch;
an electrode assembly received in the pouch in a state in which a positive electrode substrate, a negative electrode substrate disposed below the positive electrode substrate, and a separator disposed between the positive electrode substrate and the negative electrode substrate are rolled up together;
a first adhesive member for fixing at least one portion of one end of the electrode assembly to the rolled up outer surface of the electrode assembly; and
a second adhesive member for offering fixing between the electrode assembly and the pouch at a region other than the region where the first adhesive member is disposed, and
comprises a third adhesive member for offering fixing between the outer surface of the pouch facing the first adhesive member and the bracket.

9. The electronic device of claim 8, wherein the second adhesive member comprises a binder coated on at least one portion of the other region.

10. The electronic device of claim 8, wherein the outer surface of the electrode assembly comprises a first surface and a second surface facing away from the first surface,
the first adhesive member is disposed in the first surface, and
the second adhesive member is disposed in the second surface.

11. The electronic device of claim 10, wherein the pouch comprises a first plate facing the first surface, and a second plate facing the second surface,
the second adhesive member is disposed between the second surface and the second plate, and
the third adhesive member is disposed between the bracket and the first plate.

12. The electronic device of claim 8, wherein the bracket is formed in a surface facing the pouch, and comprises a recess into which the pouch is fitted.

13. The electronic device of claim 8, wherein the bracket comprises an opening formed in the recess by penetrating the bracket.

14. The electronic device of claim 8, further comprising a display,
    wherein the bracket is disposed between the display and the battery.

15. The electronic device of claim 14, further comprising a first plate forming a front surface of the electronic device, and a second plate forming a rear surface of the electronic device,
    wherein the display is disposed between the first plate and the bracket, and is exposed through the first plate, and
    the battery is disposed between the bracket and the second plate.

\* \* \* \* \*